UNITED STATES PATENT OFFICE.

WILLIAM L. CROOKS, OF SONOMA, AND THIMOTHA ROBIN, OF SAN FRANCISCO, CALIFORNIA.

HAIR-RESTORER.

SPECIFICATION forming part of Letters Patent No. 421,675, dated February 18, 1890.

Application filed November 5, 1889. Serial No. 329,346. (No specimens.)

*To all whom it may concern:*

Be it known that we, WILLIAM L. CROOKS, of Sonoma, Sonoma county, State of California, and THIMOTHA ROBIN, of the city and county of San Francisco, State of California, both citizens of the United States, have invented a new and useful Composition of Matter to be Used as a Hair Restorer and Invigorator; and we hereby declare the following to be a full, clear, and exact description of the same, sufficient in detail to enable others to compound and use the invention.

Our composition of matter consists of the following ingredients, combined in substantially the proportions stated, to wit: coal-tar, two ounces; soft soap, two ounces; washing-soda, one-half ounce; beef-grease, two ounces; beef-gall, eight ounces; water, one and a half ounce, to which may be added any suitable scent to perfume the whole. These ingredients are mixed as follows: First take the soap, the soda, the grease, and the water and place them together in a kettle and apply heat until the boiling-point is reached. Then while boiling add the coal-tar and the beef-gall, and as this addition reduces the temperature below the boiling-point the entire mass must be again brought to the boil. The mass is to be continually stirred and allowed to boil but a very short time—say half a minute. Then pour the whole mass into a suitable receptacle or suitable molds and allow it to cool and become hard.

The composition is to be applied like a soap, with water, so as to make a lather, which is then washed off.

The coal-tar is invigorating. The soft soap (which is the ordinary soap made from wood-ashes) serves to render the mass saponaceous, in which the soda and the grease unite, while the beef-gall, which we regard as the essential ingredient and novelty of the composition, is introduced as a penetrant to open the pores of the skin and clean them out, cleansing the surface as well and cutting and removing the dandruff.

Having thus described our invention, what we claim as new, and desire to secure by Letters Patent, is—

The composition of matter herein described, to be used as a hair restorer and invigorator, consisting of beef-gall combined with coal-tar, soft soap, washing-soda, beef-grease, and water, in substantially the proportions stated.

In witness whereof we have hereunto set our hands.

WILLIAM L. CROOKS.
THIMOTHA X ROBIN.
her     mark

Witnesses:
ADOLPHE ROBIN,
J. H. BLOOD.